Patented Sept. 13, 1932

1,877,301

UNITED STATES PATENT OFFICE

ERNEST F. GRETHER, OF MIDLAND, MICHIGAN, ASSIGNOR TO THE DOW CHEMICAL COMPANY, OF MIDLAND, MICHIGAN, A CORPORATION OF MICHIGAN

METHOD OF MAKING DERIVATIVES OF DIARYLETHERS

No Drawing. Application filed June 28, 1928. Serial No. 289,081.

This invention relates to the discovery of certain novel diarylether derivatives, viz. sulphonic acid and nitrosulphonic acid derivatives of diarylethers in which one, or both, of the aryl groups consists of a naphthyl group, and more particularly to such derivatives of phenyl-α-naphthyl ether, and to methods of making such derivatives.

It is known that the naphthyl-alkyl ethers split off the alkyl group when treated with sulphuric acid. I have found, however, that diaryl ethers containing a naphthyl group, or groups, are much more stable and can be transformed into their sulphonic acids without decomposition by the action of concentrated sulphuric acid. The resulting sulphonic acids are distinguished from the corresponding ethers, and other derivatives of such ethers, as chloro-, bromo-, nitro- and other substituted derivatives, in that they are soluble in aqueous media. They therefore lend themselves more readily to further treatment by the ordinary methods of halogenation, nitration, et cetera, than do the ethers, or the other derivatives thereof just mentioned. Such sulphonic acid derivatives are in themselves valuable intermediate compounds, and yield upon further treatment, as by nitration or halogenation, other valuable intermediate products for the manufacture of dyestuffs and other organic chemicals.

To the accomplishment of the foregoing and related ends, the invention then, consists of the steps and products hereinafter fully described and particularly pointed out in the claims, the following description setting forth but several of the various ways in which the principle of the invention may be employed.

The aforesaid naphthyl ethers readily add on one sulpho group by treatment with ordinary concentrated sulphuric acid. The reaction starts at ordinary temperature, and is completed by heating to 60° to 80° C. for a short time. To introduce further sulpho groups fuming sulphuric acid and a temperature as high as 150° to 160° C. are usually necessary. In general the mono- and poly-sulphonic acids so obtained have a well defined crystalline form and can be readily crystallized from the reaction mixture, or transformed into their salts. The salts are colorless and soluble in water.

The nitro compounds of the several sulphonic acids can be readily prepared by directly treating the reaction mixture resulting from the sulphonation step with nitric acid. With one equivalent of nitric acid, the mononitro-sulphonic acids of the naphthyl ethers are formed, while if an excess of nitric acid is used poly-nitro sulphonic acids are obtained. These nitro-sulphonic acids and their salts are soluble in water, forming clear yellow solutions. In most cases the salts can be crystallized out by concentrating their solutions.

The nitro-sulphonic acids and their salts dye wool in bright, clear yellow shades, which upon further treatment with copper salts are transformed into greenish shades.

Upon reduction, the corresponding amino compounds are obtained from the aforesaid nitro-sulphonic acids, which amino compounds are useful intermediates for making dyestuffs.

By way of illustration, I will describe in detail the steps for making mono-nitro phenyl-α-naphthyl ether-sulfonic acid, but it is understood that the invention is not limited thereto.

I take 50 parts of phenyl-α-naphthyl ether, which may be conveniently obtained by reaction between potassium phenate and α-chlor-naphthalene in the presence of a copper catalyst (Ullmann's reaction), and mix with 250 parts of concentrated sulphuric acid. The ether is at first colored yellow, and by stirring or shaking it passes partly into solution, giving off some heat. On continued heating to about 80° C. for approximately one-half hour, the remainder of the ether is dissolved, and a clear, slightly colored solution of the mono-sulphonic acid is formed, which on cooling and standing crystallizes, filling the whole reaction mixture with white crystals. To this mixture are slowly added 26 parts of nitric acid, specific gravity 1.4, with stirring and cooling to maintain the temperature below about 30° C. The reaction product is dissolved in water and sulphuric acid neutralized and precipitated with lime. The resulting solution of the calcium salt is treated with sodium sulphate to form a solution of the sodium salt of phenyl-α-naphthyl ether mono-nitro-sulphonic acid. The deep yellow-colored solution is filtered and evaporated to obtain the solid sodium salt.

It is difficult to determine precisely the orientation of the substituent nitro and sulpho groups respectively, in this compound, but I believe its constitution is represented substantially by the graphic formula:

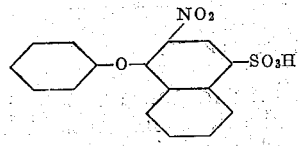

The identity of this compound is clearly established by the method of its preparation as herein described.

An alternative procedure would be to obtain the sodium salt of the mono-sulphonic acid first formed as above, which is thereupon nitrated at a temperature not exceeding 20° to 30° C. Nitrating at higher temperatures produces poly-nitro derivatives which have an orange color and dye wool in orange shades.

In similar manner the mono-nitro-sulphonic acid of α-β-dinaphthyl ether, made from α-chlor-naphthalene and β-naphthol, or its salt may be obtained by starting with such ether, and likewise the sulphonic acids and nitro-sulphonic acids of related di-aryl ethers, in which one or both of the aryl groups is represented by a naphthyl group.

It is obviously possible to obtain such product, e. g., mono-nitro-sulphonic acid of phenyl-α-naphthyl ether, by nitrating the ether first, and then sulphonating the nitro compound. This method is less convenient, however, owing to the insolubility of the ether or the nitro compounds in aqueous media. In following this procedure it is necessary for a good yield to dissolve the ether in glacial acetic acid and then nitrate at a temperature below about 25° C., to obtain the mono-nitro derivative, which may thereupon be sulphonated to form the mono-nitro-sulphonic acid. The latter procedure is much more costly, and for that reason the first described method is to be preferred. The mono-nitro derivative, obtained as above, crystallizes from glacial acetic acid in yellow crystals, having a melting point of 93°–94° C.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. In a method of making diaryl ether derivatives, the step which consists in reacting upon phenyl-α-naphthyl ether with sulphuric acid at a temperature below 100° C.

2. As a new product, a sulphonic acid derivative of phenyl-α-naphthyl ether in which at least one sulfonic acid group is attached to the naphthalene residue.

3. In a method for making a sulfonated naphthyl-phenyl ether, the step which consists of reacting between a naphthyl-phenyl ether and sulfuric acid.

4. In a method for making a diaryl ether derivative, the step which consists of reacting between phenyl-alpha-naphthyl ether and sulfuric acid.

5. In a method for making a mono-sulfonic acid of a naphthyl-phenyl ether, the step which consists of reacting between a naphthyl-phenyl ether and sulfuric acid at a temperature below 100° C.

6. As a new product, a sulfonic acid of a naphthyl-phenyl ether, wherein at least one sulfonic acid group is attached to the naphthalene residue.

7. As a new product, a mono-sulfonic acid of a naphthyl-phenyl ether, having the probable formula, Phenyl-O-$C_{10}H_6$-$SO_3H$.

8. As a new product, a mono-sulfonic acid derivative of alphanaphthyl-phenyl ether, having the probable formula,

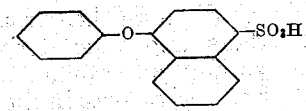

Signed by me this 25th day of June, 1928.
ERNEST F. GRETHER.